United States Patent
Brown et al.

(10) Patent No.: US 12,054,033 B2
(45) Date of Patent: *Aug. 6, 2024

(54) HEAT PUMP REFRIGERANT LOOP ARRANGEMENTS

(71) Applicant: Ford Global Technologies, LLC, Dearborn, MI (US)

(72) Inventors: Jeffrey Paul Brown, Farmington Hills, MI (US); Manfred Koberstein, Troy, MI (US); Loren John Lohmeyer, Monroe, MI (US); Rachael Shey, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

This patent is subject to a terminal disclaimer.

(21) Appl. No.: 18/075,663

(22) Filed: Dec. 6, 2022

(65) Prior Publication Data

US 2023/0109595 A1 Apr. 6, 2023

Related U.S. Application Data

(63) Continuation of application No. 17/357,149, filed on Jun. 24, 2021, now Pat. No. 11,560,042.

(51) Int. Cl.
*B60H 1/32* (2006.01)
*B60H 1/00* (2006.01)

(52) U.S. Cl.
CPC ......... *B60H 1/323* (2013.01); *B60H 1/00485* (2013.01); *B60H 1/3227* (2013.01); *B60H 1/32284* (2019.05)

(58) Field of Classification Search
CPC ............... B60H 1/323; B60H 1/32284; B60H 1/00485; B60H 1/3227
USPC ......................................................... 62/244
See application file for complete search history.

(56) References Cited

U.S. PATENT DOCUMENTS

| | | | |
|---|---|---|---|
| 4,193,271 A | 3/1980 | Honigsbaum | |
| 6,405,793 B1 | 6/2002 | Ghodbane et al. | |
| 8,763,418 B2 | 7/2014 | Kim et al. | |
| 9,180,753 B2 | 11/2015 | Kim et al. | |
| 10,753,686 B2 | 8/2020 | Kim et al. | |
| 10,787,061 B2 | 9/2020 | Durrani et al. | |
| 11,560,042 B2 * | 1/2023 | Brown | B60H 1/32284 |

(Continued)

FOREIGN PATENT DOCUMENTS

| | | |
|---|---|---|
| CN | 104748516 B | 12/2014 |
| DE | 10343225 B3 * | 4/2005 |

(Continued)

*Primary Examiner* — Davis D Hwu
(74) *Attorney, Agent, or Firm* — Vichit Chea; Price Heneveld LLP

(57) ABSTRACT

A heat pump includes a refrigerant loop. The refrigerant loop includes a compressor, a first condenser, a vapor generator having a first region and a second region, a first expansion valve, a second expansion valve, and a first evaporator. A branching point is positioned between the first condenser and the vapor generator. The branching point diverts a portion of a first heat exchange fluid circulating through the refrigerant loop to the vapor generator. The first expansion valve is positioned between the branching point and the vapor generator. An outlet of the vapor generator is coupled to a mid-pressure inlet port of the compressor.

20 Claims, 11 Drawing Sheets

(56) References Cited

U.S. PATENT DOCUMENTS

| | | | |
|---|---|---|---|
| 2011/0203300 A1* | 8/2011 | Rafalovich | F25B 6/04 62/93 |
| 2011/0284181 A1 | 11/2011 | Rached | |
| 2015/0266353 A1 | 9/2015 | Lu | |
| 2016/0107507 A1 | 4/2016 | Johnston | |

FOREIGN PATENT DOCUMENTS

| | | |
|---|---|---|
| DE | 102019129304 A1 * | 11/2020 |
| KR | 102039163 B1 * | 11/2019 |

* cited by examiner

HEAT PUMP REFRIGERANT LOOP ARRANGEMENTS

CROSS-REFERENCE TO RELATED APPLICATION

This application is a continuation application of U.S. patent application Ser. No. 17/357,149 filed Jun. 24, 2021, entitled "HEAT PUMP REFRIGERANT LOOP ARRANGEMENTS," now U.S. Pat. No. 11,560,042. The aforementioned related application is hereby incorporated by reference in its entirety.

FIELD OF THE DISCLOSURE

The present disclosure generally relates to heat pumps. More specifically, the present disclosure relates to refrigerant loop arrangements for heat pumps.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes a compressor, a first condenser, a vapor generator, a first receiver-dryer, a first branching point, a first expansion valve, a first evaporator, a second expansion valve, and a heat exchanger. The first condenser is positioned downstream of the compressor and coupled to an outlet port of the compressor. The vapor generator is positioned downstream of the first condenser. The vapor generator includes a first region having a first inlet and a first outlet and a second region having a second inlet and a second outlet. The vapor generator receives a first heat exchange fluid. The first receiver-dryer is positioned between the first condenser and the vapor generator. The first branching point is positioned between the first condenser and the vapor generator. The first branching point diverts a portion of the first heat exchange fluid circulating through the refrigerant loop to a first inlet of the vapor generator. The first expansion valve is positioned between the first branching point and the first inlet of the vapor generator. A first outlet of the vapor generator is coupled to a mid-pressure inlet port of the compressor. The first evaporator is positioned downstream of the vapor generator and coupled to a second outlet of the vapor generator. The second expansion valve is positioned between the first evaporator and the vapor generator. The first evaporator is upstream of the compressor and is coupled to a low-pressure inlet port of the compressor. The heat exchanger has a first region and a second region. The first region of the heat exchanger is positioned between the second outlet of the vapor generator and the second expansion valve. The first region of the heat exchanger is plumbed in series with the second region of the vapor generator such that an inlet of the first region of the heat exchanger is directly coupled to an outlet of the second region of the vapor generator.

Embodiments of the first aspect of the invention can include any one or a combination of the following features:
an inlet of the second region of the heat exchanger is positioned downstream of the first evaporator;
an outlet of the second region of the heat exchanger is positioned upstream of the low-pressure inlet port of the compressor;
a second evaporator is positioned downstream of the vapor generator and coupled to the second outlet of the vapor generator;
the second evaporator is plumbed in parallel to the first evaporator;
a third expansion valve is positioned between the second evaporator and the vapor generator;
the third expansion valve is plumbed in parallel with the second expansion valve;
an inlet of the second region of the heat exchanger is positioned downstream of the second evaporator;
a bypass loop that includes an inlet and an outlet, where the bypass loop is configured to bypass the second region of the heat exchanger;
the inlet of the bypass loop is positioned immediately upstream of the second region of the heat exchanger;
the outlet of the bypass loop is positioned immediately upstream of the low-pressure inlet port of the compressor;
the bypass loop includes a shutoff valve positioned between the inlet of the bypass loop and the outlet of the bypass loop;
an auxiliary refrigerant loop where the auxiliary refrigerant loop includes an auxiliary compressor; an auxiliary condenser positioned downstream of the auxiliary compressor and coupled to an outlet port of the auxiliary compressor; an auxiliary expansion valve positioned downstream of the auxiliary condenser; and an auxiliary evaporator positioned downstream of the auxiliary expansion valve and coupled to the auxiliary expansion value, where the auxiliary evaporator is upstream of the auxiliary compressor and coupled to a low-pressure inlet port of the auxiliary compressor; and
an auxiliary receiver-dryer positioned downstream of the auxiliary condenser, where the auxiliary receiver-dryer is positioned upstream of the auxiliary evaporator.

According to a second aspect of the present disclosure, a heat pump includes a refrigerant loop. The refrigerant loop includes a compressor, a first condenser, a vapor generator, a first receiver-dryer, a first branching point, a first expansion valve, a first evaporator, a second expansion valve, a heat exchanger, a second evaporator, and a third expansion valve. The first condenser is positioned downstream of the compressor and coupled to an outlet port of the compressor. The vapor generator is positioned downstream of the first condenser. The vapor generator includes a first region having a first inlet and a first outlet and a second region having a second inlet and a second outlet. The vapor generator receives a first heat exchange fluid. The first receiver-dryer is positioned between the first condenser and the vapor generator. The first branching point is positioned between the first condenser and the vapor generator. The first branching point diverts a portion of the first heat exchange fluid circulating through the refrigerant loop to a first inlet of the vapor generator. The first expansion valve is positioned between the first branching point and the first inlet of the vapor generator. A first outlet of the vapor generator is coupled to a mid-pressure inlet port of the compressor. The first evaporator is positioned downstream of the vapor generator and coupled to a second outlet of the vapor generator. The second expansion valve is positioned between the first evaporator and the vapor generator. The first evaporator is upstream of the compressor and is coupled to a low-pressure inlet port of the compressor. The heat exchanger has a first region and a second region. The first region of the heat exchanger is positioned between the second outlet of the vapor generator and the second expansion valve. The first region of the heat exchanger is plumbed in series with the second region of the vapor generator such that an inlet of the first region of the heat exchanger is directly coupled to an outlet of the second region of the vapor generator. An inlet of the second region of the heat exchanger is positioned downstream of the first evaporator. An outlet of the second region of the heat exchanger is positioned upstream of the low-pressure inlet port of the compressor. A second evaporator is positioned downstream of the vapor generator and coupled to the second outlet of the vapor generator and is plumbed in parallel to the first evaporator. An inlet of the second region of the heat exchanger is positioned downstream of the second evaporator. A third expansion valve is positioned between the second evaporator and the vapor generator and is plumbed in parallel to the second expansion valve.

Embodiments of the second aspect of the present disclosure can include any one or a combination of the following features:

- a bypass loop having an inlet and an outlet where the bypass loop is configured to bypass the second region of the heat exchanger and where the inlet of the bypass loop is positioned immediately upstream of the second region of the heat exchanger;
- the outlet of the bypass loop is positioned immediately upstream of the low-pressure inlet port of the compressor;
- the bypass loop includes a shutoff valve positioned between the inlet of the bypass loop and the outlet of the bypass loop;
- an auxiliary refrigerant loop that includes an auxiliary compressor; an auxiliary condenser downstream of the auxiliary compressor and coupled to an outlet port of the auxiliary compressor; an auxiliary expansion valve positioned downstream of the auxiliary condenser; and an auxiliary evaporator downstream of the auxiliary expansion valve and coupled to the auxiliary expansion value, where the auxiliary evaporator is upstream of the auxiliary compressor and coupled to a low-pressure inlet port of the auxiliary compressor; and
- an auxiliary receiver-dryer positioned downstream of the auxiliary condenser, where the auxiliary receiver-dryer is positioned upstream of the auxiliary evaporator.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
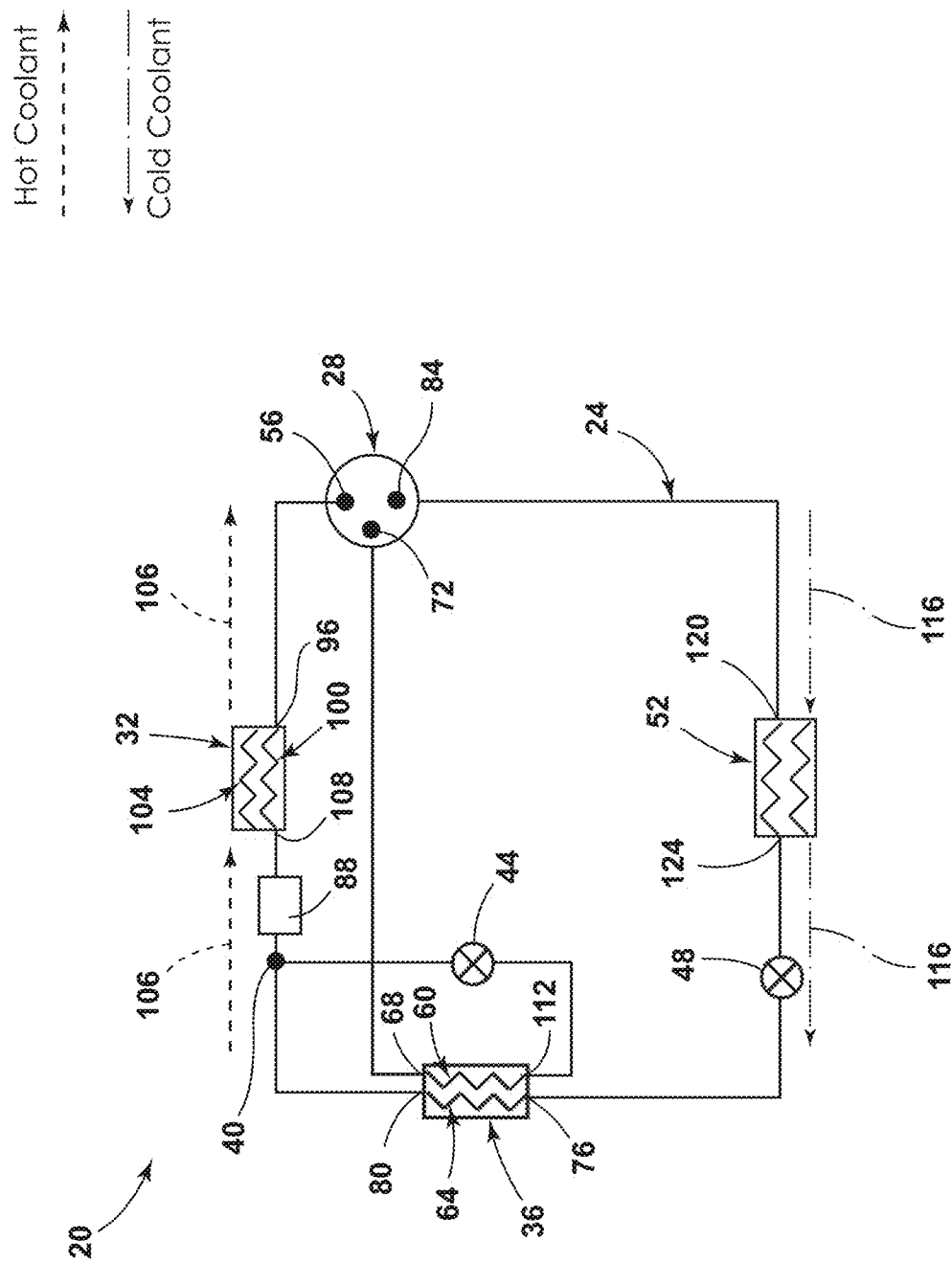
FIG. 1 is a schematic representation of a refrigerant loop arrangement, illustrating various components for exchanging heat within a heat pump, according to one example.
Figure 2:
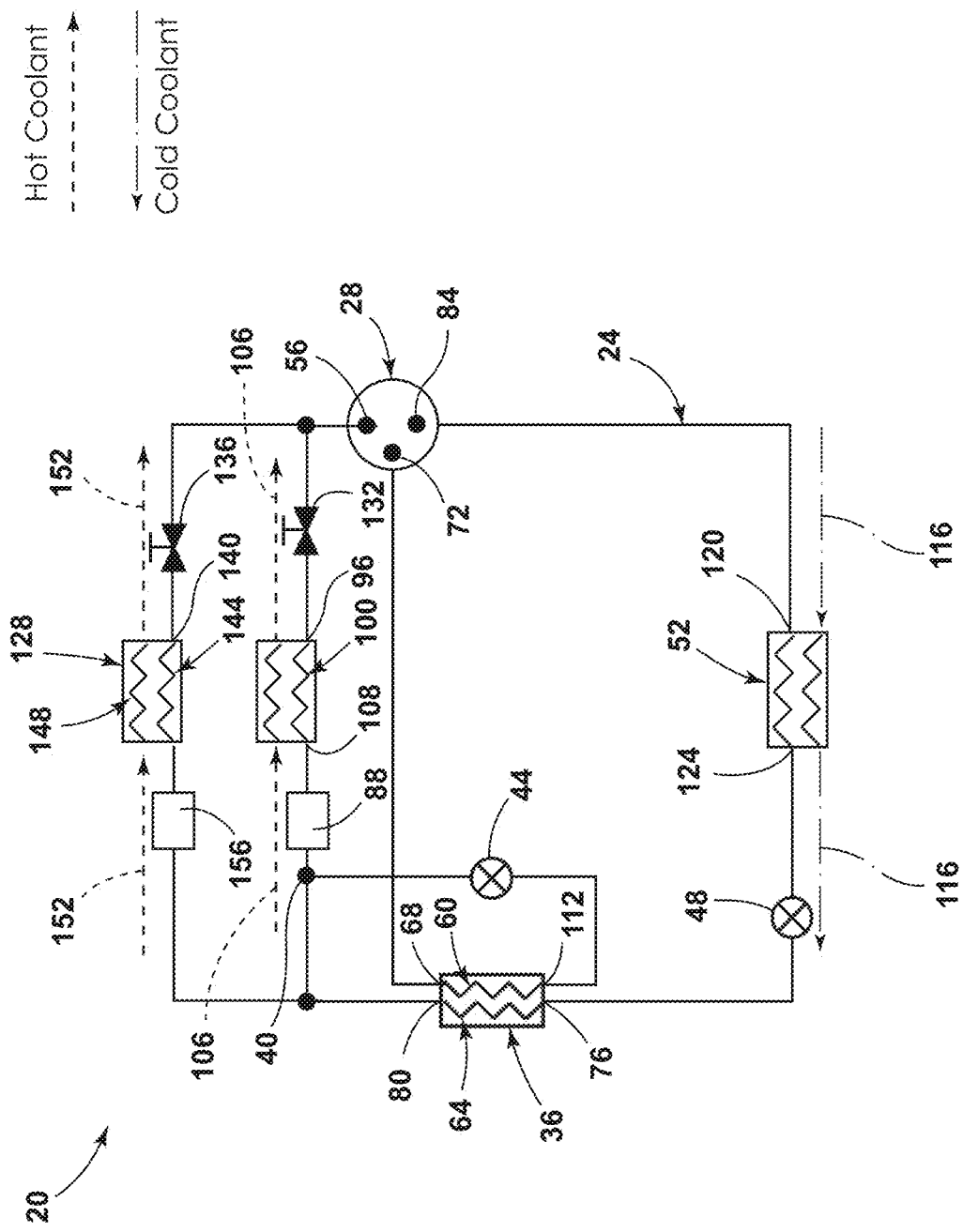
FIG. 2 is a schematic representation of the refrigerant loop arrangement, illustrating a first condenser and a second condenser, according to one example.
Figure 3:
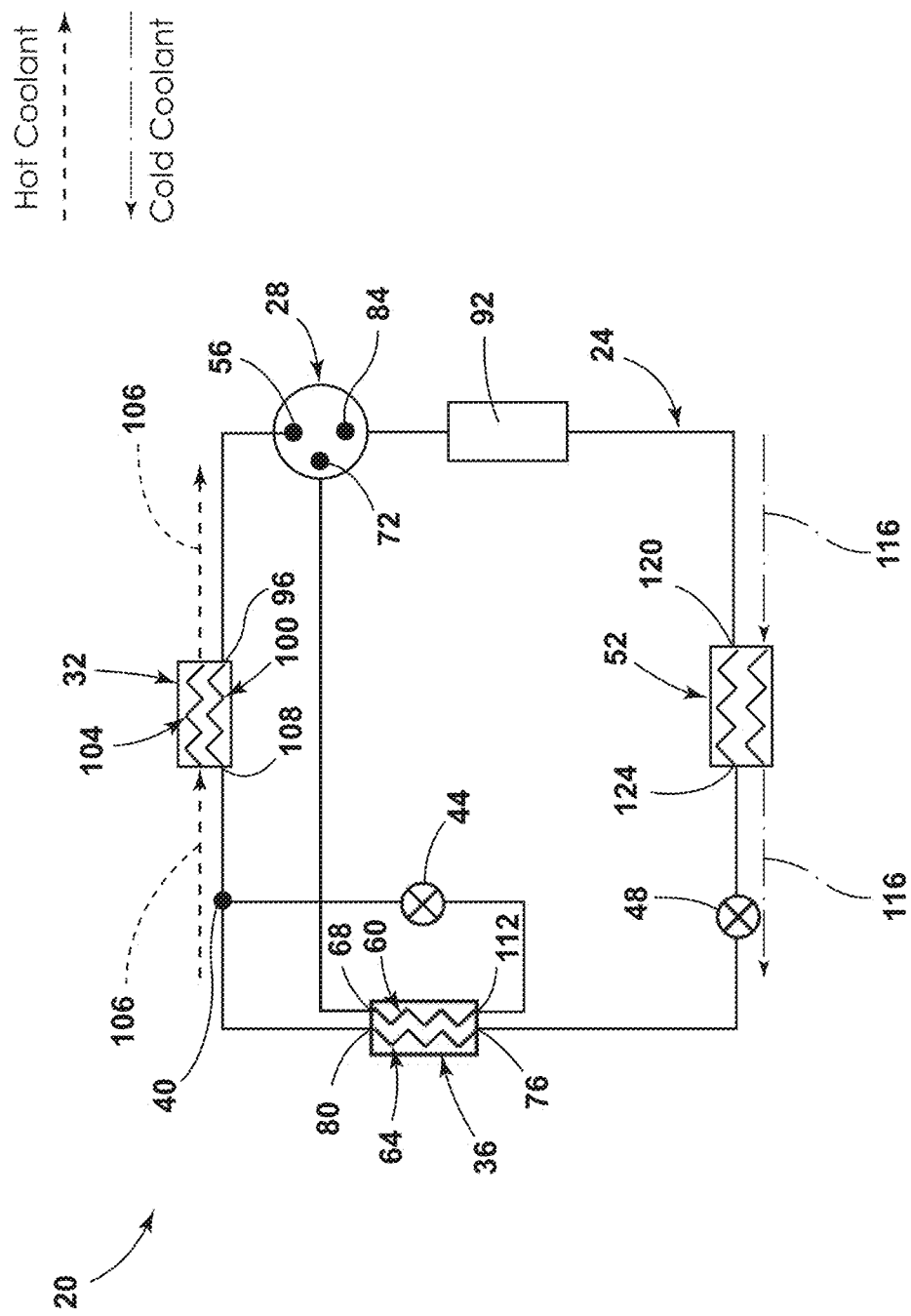
FIG. 3 is a schematic representation of the refrigerant loop arrangement, illustrating various component for exchanging heat within the heat pump, according to one example.
Figure 4:
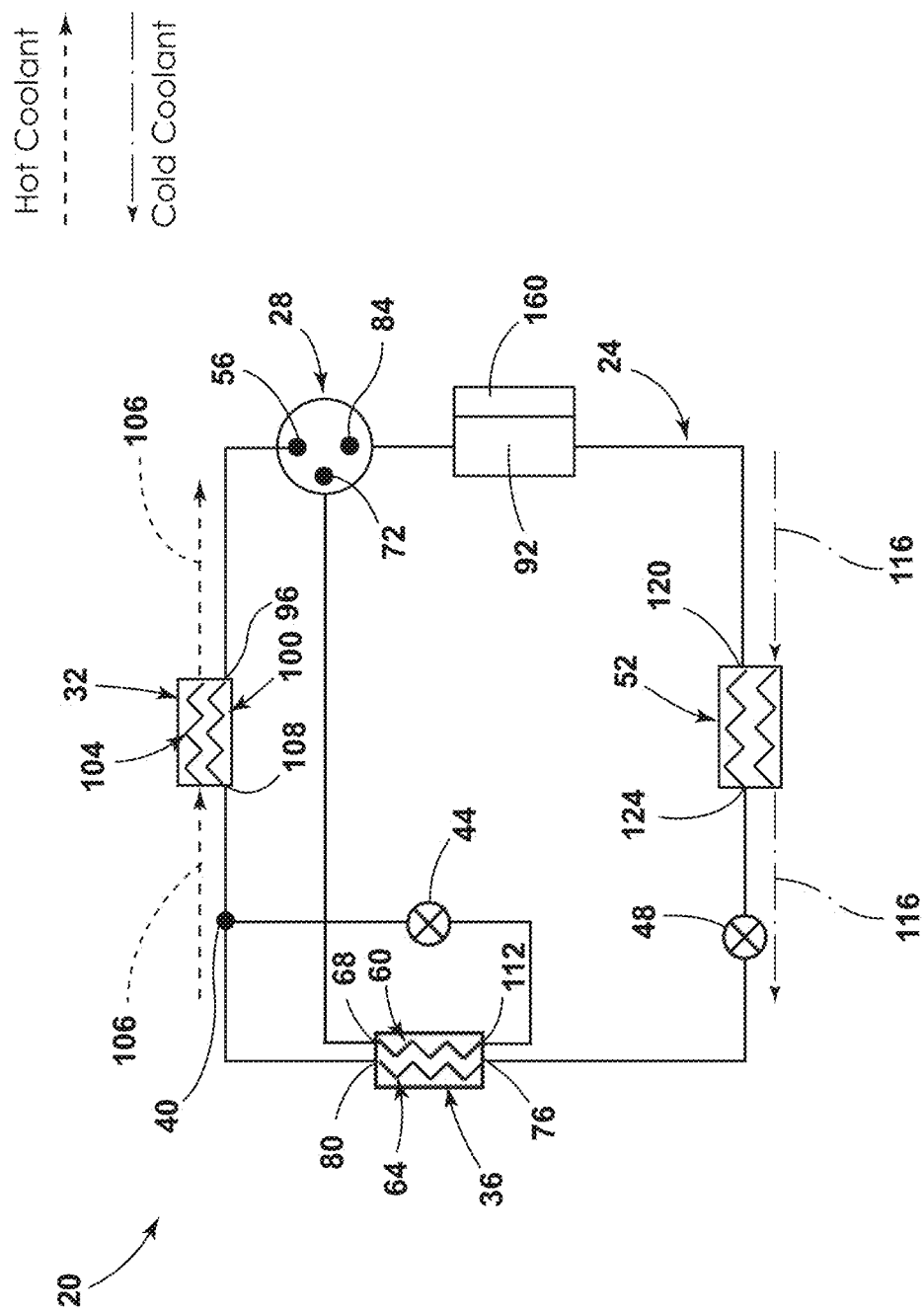
FIG. 4 is a schematic representation of the refrigerant loop arrangement, illustrating a heater coupled to an accumulator, according to one example.
Figure 5:
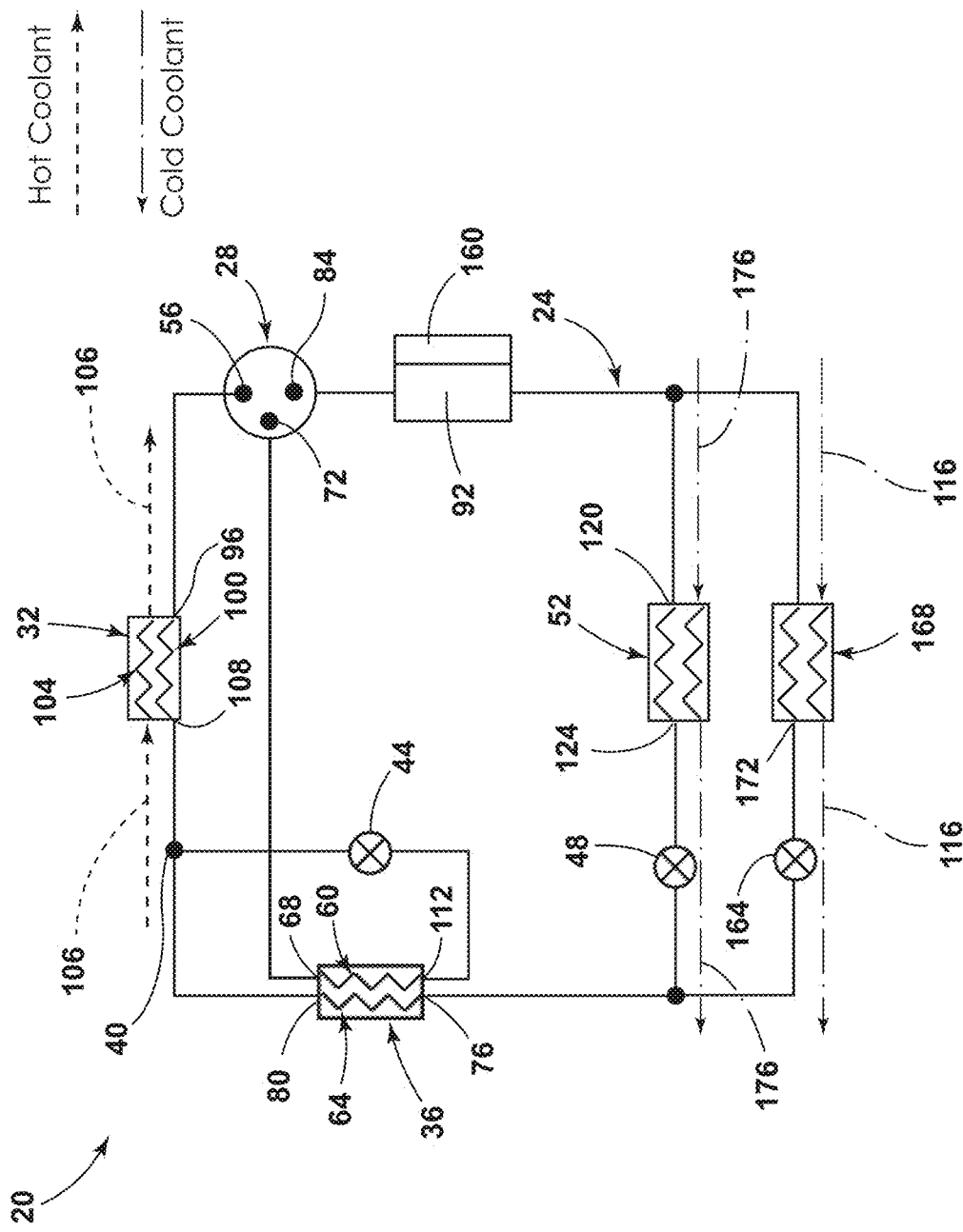
FIG. 5 is a schematic representation of the refrigerant loop arrangement, illustrating a first evaporator and a second evaporator, according to one example.
Figure 6:
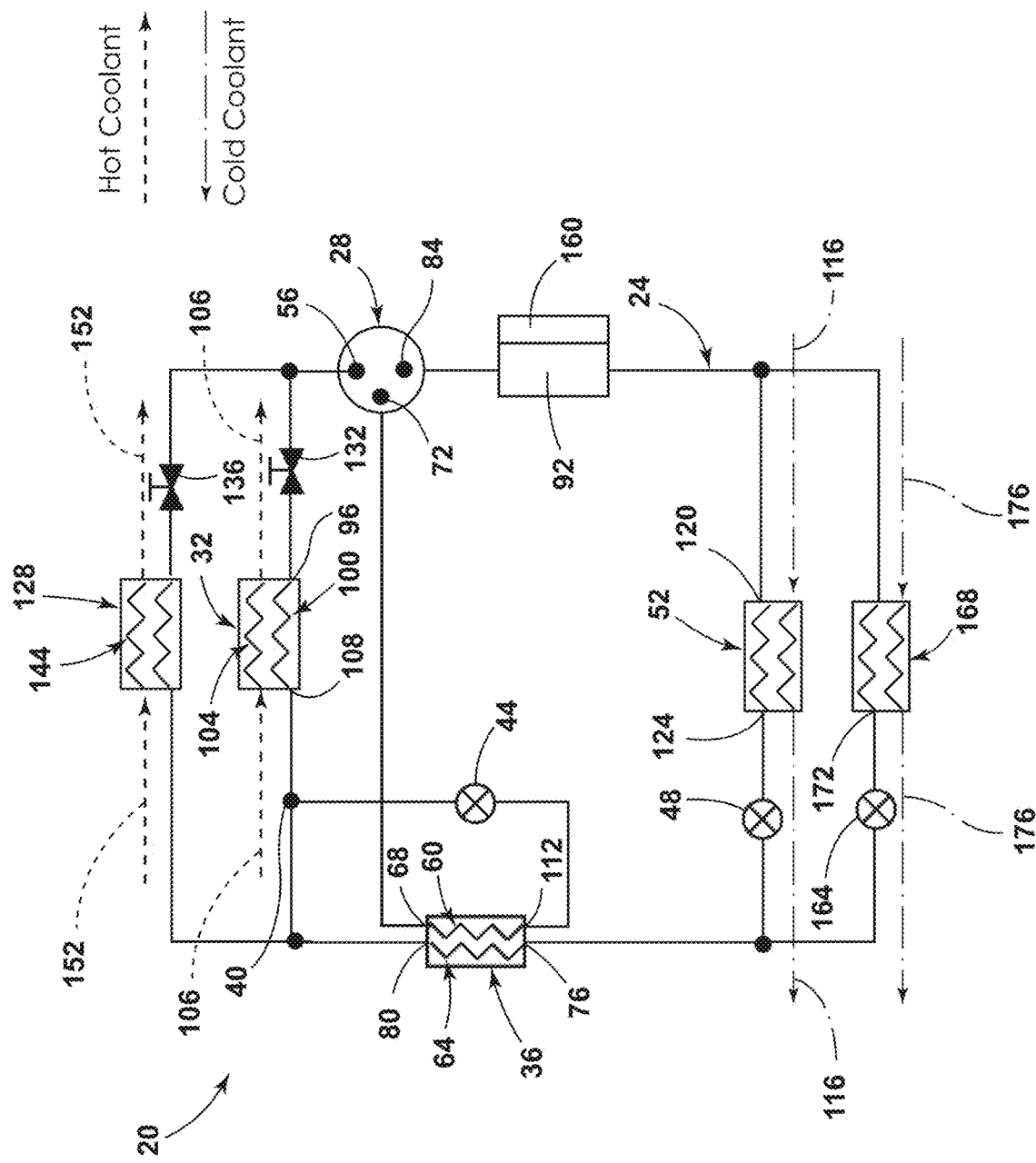
FIG. 6 is a schematic representation of the refrigerant loop arrangement, illustrating the first condenser, the second condenser, the first evaporator, the second evaporator, and the heater coupled to the accumulator, according to one example.
Figure 7:
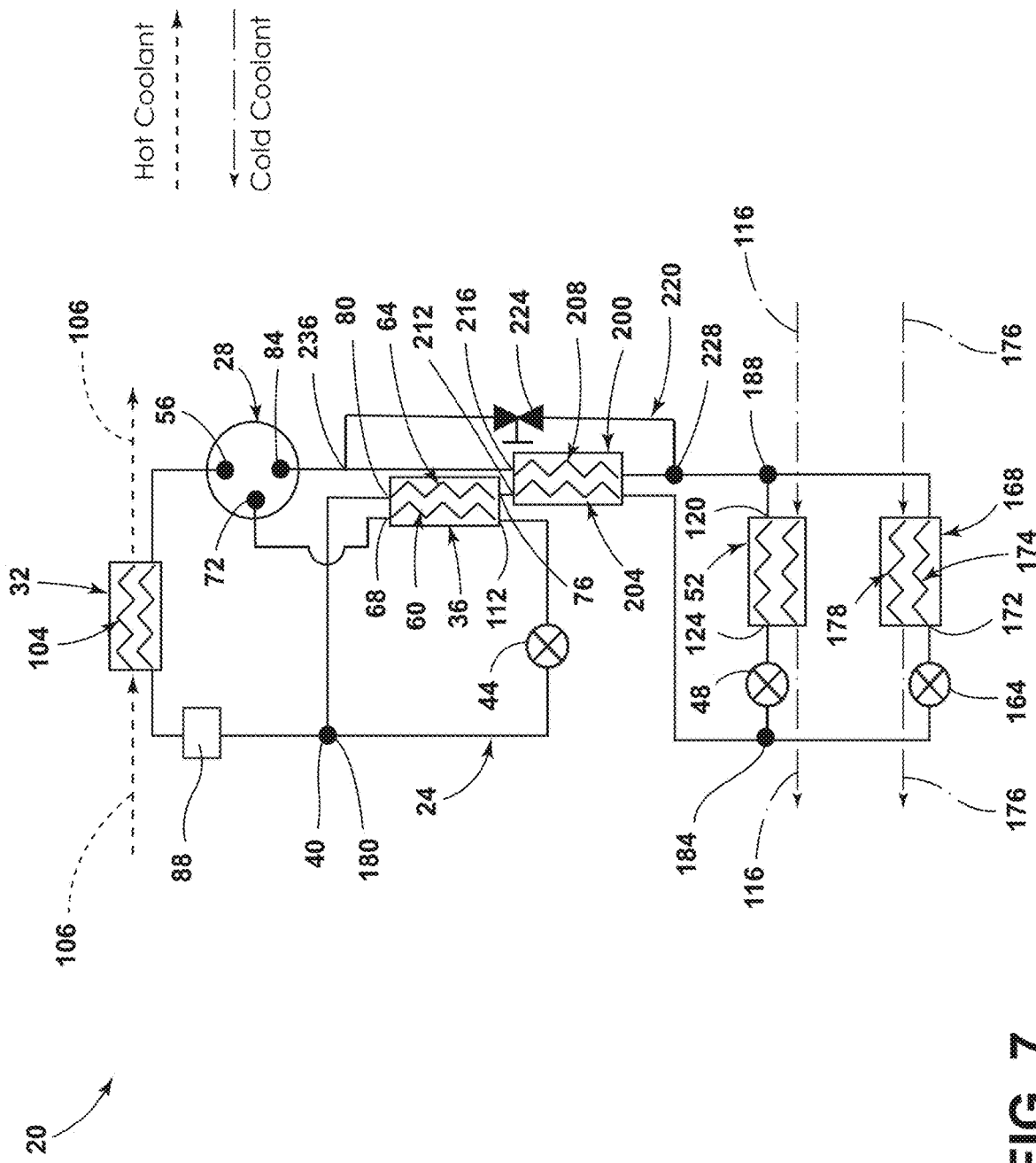
FIG. 7 is a schematic representation of the refrigerant loop arrangement, illustrating a vapor generator and a heat exchanger plumbed in series, according to one example.
Figure 8:
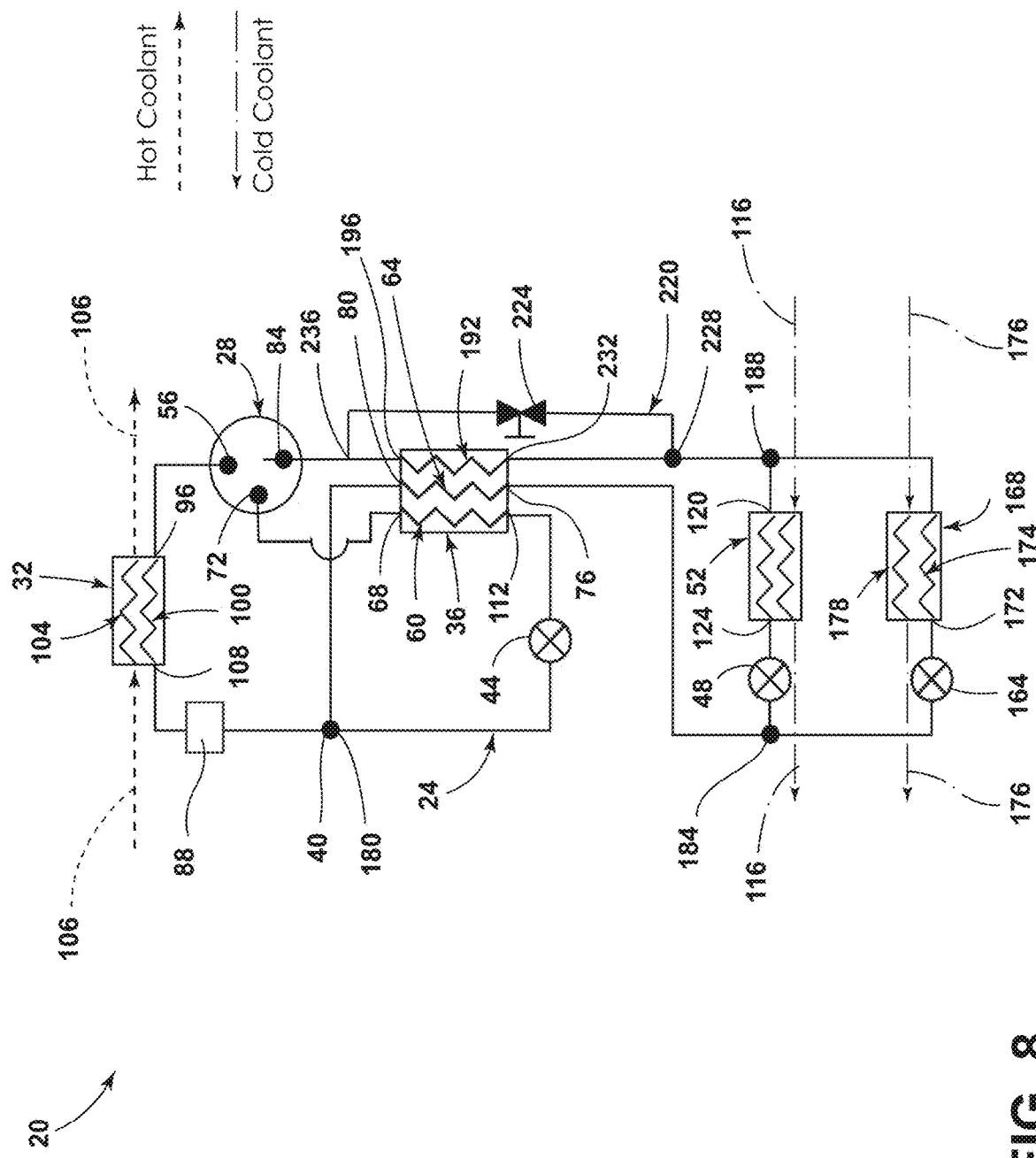
FIG. 8 is a schematic representation of the refrigerant loop arrangement, illustrating the vapor generator with first, second, and third regions, according to one example.
Figure 9:
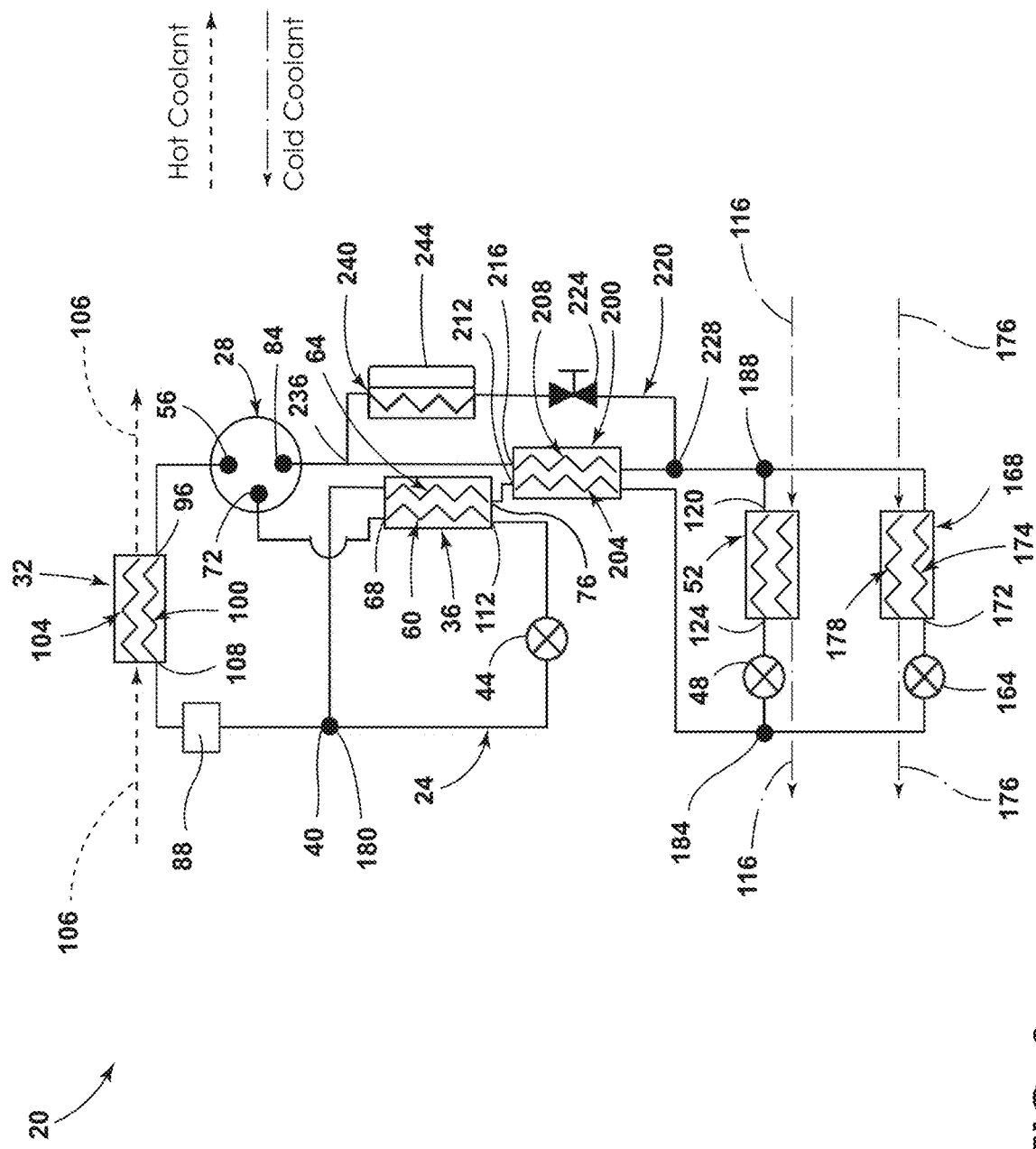
FIG. 9 is a schematic representation of the refrigerant loop arrangement, illustrating a bypass loop having a bypass heat exchanger, according to one example.
Figure 10:
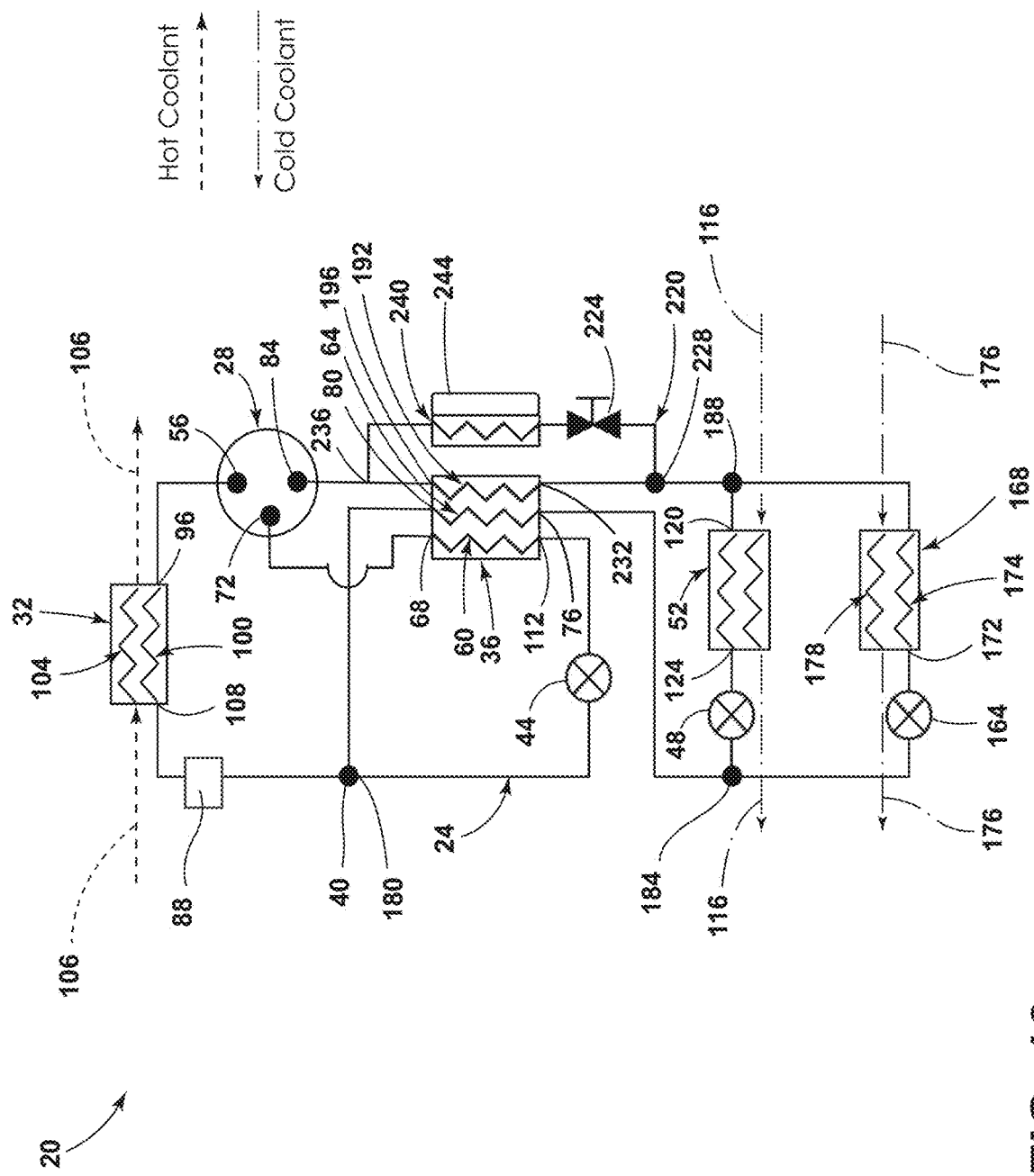
FIG. 10 is a schematic representation of the refrigerant loop arrangement, illustrating the bypass loop having the bypass heat exchanger, according to another example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-11, a heat pump 20 includes a refrigerant loop 24. The refrigerant loop 24 includes a compressor 28, a first condenser 32, a vapor generator 36, a branching point 40, a first expansion valve 44, a second expansion valve 48, and a first evaporator 52. The first condenser 32 is positioned downstream of the compressor 28. The first condenser 32 is coupled to an outlet port 56 of the compressor 28. The vapor generator 36 is positioned downstream of the first condenser 32. The vapor generator 36 includes a first region 60 and a second region 64. The branching point 40 is positioned between the first condenser 32 and the vapor generator 36. The branching point 40 diverts a portion of a first heat exchange fluid circulating through the refrigerant loop 24 to the first region 60 of the vapor generator 36. The first expansion valve 44 is positioned between the branching point 40 and the first region 60 of the vapor generator 36. An outlet 68 of the first region 60 of the vapor generator 36 is coupled to a mid-pressure inlet port 72 of the compressor 28. The second expansion valve 48 is positioned downstream of the vapor generator 36. The second expansion valve 48 is coupled to an outlet 76 of the second region 64 of the vapor generator 36. An inlet 80 of the second region 64 of the vapor generator 36 is coupled to the first condenser 32. The first evaporator 52 is positioned downstream of the second expansion valve 48. The first evaporator 52 is coupled to the second expansion valve 48. The first evaporator 52 is positioned upstream of the compressor 28. The first evaporator 52 is coupled to a low-pressure inlet port 84 of the compressor 28.

Referring again to FIGS. 1-6, the refrigerant loop 24 of the heat pump 20 can include a first receiver-dryer 88 (see FIGS. 1 and 2) and/or an accumulator 92 (see FIGS. 3-6). In examples that include the first receiver-dryer 88, the first receiver-dryer 88 can be positioned between the first condenser 32 and the vapor generator 36. The first condenser 32 can receive the first heat exchange fluid from the outlet port 56 of the compressor 28 at an inlet 96 of a first region 100 of the first condenser 32. As the first heat exchange fluid flows through the first region 100 of the first condenser 32, the first heat exchange fluid thermally interacts with a second heat exchange fluid (e.g., a coolant) that is flowing through a second region 104 of the first condenser 32, as indicated by arrows 106. The first heat exchange fluid exits the first region 100 of the first condenser 32 by way of an outlet 108 of the first condenser 32. Next, in examples that employ the first receiver-dryer 88, the first heat exchange fluid can flow into the first receiver-dryer 88 after exiting the first condenser 32. The first receiver-dryer 88 can act as a temporary storage container for the first heat exchange fluid during low system demands when operating the heat pump 20. Additionally, the first receiver-dryer 88 can contain a desiccant that is used to absorb moisture (e.g., water) that may have entered the first heat exchange fluid. In some examples, the first receiver-dryer 88 may include a filter that can trap debris that may have entered into the refrigerant loop 24 and/or the first heat exchange fluid. Upon exiting the first receiver-dryer 88, the first heat exchange fluid encounters the branching point 40. As the first heat exchange fluid encounters the branching point 40, a portion of the first heat exchange fluid is diverted toward the first expansion valve 44, while the remaining portion of the first heat exchange fluid continues toward the vapor generator 36. In various examples, the portion of the first heat exchange fluid that is diverted toward the first expansion valve 44 can be expressed as a ratio or percentage. For example, expressing the ratio as a percentage of the first heat exchange fluid that is diverted towards the first expansion valve 44, the first expansion valve 44 can receive about 5%, about 10%, about 15%, about 20%, about 25%, about 30%, about 35%, about 40%, about 45%, about 50%, about 55%, or about 60% of the first heat exchange fluid that is exiting the first receiver-dryer 88. The remainder, or balancing percentage, of the first heat exchange fluid exiting the first receiver-dryer 88 that is not diverted toward the first expansion valve 44 can continue toward the vapor generator 36.

Referring further to FIGS. 1-6, the portion of the first heat exchange fluid that is diverted toward the first expansion valve 44 decreases in pressure and temperature as a result of interaction with the first expansion valve 44. After exiting the first expansion valve 44, the first heat exchange fluid is directed to an inlet 112 of the first region 60 of the vapor generator 36. As the first heat exchange fluid flows through the first region 60 of the vapor generator 36, the first heat exchange fluid within the first region 60 thermally interacts with the first heat exchange fluid flowing through the second region 64 of the vapor generator 36. As a result of the thermal interaction between the first heat exchange fluid within the first region 60 and the first heat exchange fluid within the second region 64, the first heat exchange fluid within the first region 60 exits the vapor generator 36 at the outlet 68 of the first region 60 at a higher temperature, pressure, and/or vapor percentage. Accordingly, the portion of the refrigerant loop 24 that includes the branching point 40, the first expansion valve 44, and the vapor generator 36 may be referred to as a vapor generator or a vapor generation loop. As the first heat exchange fluid exits the outlet 68 of the first region 60, the first heat exchange fluid is directed toward the mid-pressure inlet port 72 of the compressor 28. The first heat exchange fluid from the first region 60 of the vapor generator 36 is injected into the compressor 28. The injection of the first heat exchange fluid at the mid-pressure inlet port 72 of the compressor 28 can improve an efficiency of the refrigerant loop 24 and/or increase a heat exchange capacity of the refrigerant loop 24. For example, the injection of the first heat exchange fluid at the mid-pressure inlet port 72 of the compressor 28 can increase a condensing capacity of the refrigerant loop 24 while decreasing a load experienced by the compressor 28. The improved condensing capacity of the refrigerant loop 24 and the decreased load on the compressor 28 can contribute to performance and efficiency improvements for the heat pump 20 and the refrigerant loop 24. Additionally, the injection of the first heat exchange fluid at the mid-pressure inlet port 72 can increase an ambient temperature operating range of the heat pump 20 and/or the refrigerant loop 24.

Referring still further to FIGS. 1-6, the portion of the first heat exchange fluid that was not diverted toward the first expansion valve 44 and instead flowed toward the inlet 80 of the second region 64 of the vapor generator 36 thermally interacts with the first heat exchange fluid that was diverted toward the first expansion valve 44. During this thermal interaction between the first heat exchange fluid within the second region 64 and the first heat exchange fluid within the first region 60, heat is transferred from the first heat exchange fluid within the second region 64 to the first heat exchange fluid within the first region 60. Accordingly, the first heat exchange fluid exiting the vapor generator 36 at the outlet 76 may be at a different temperature, pressure, and/or vapor percentage than the first heat exchange fluid that entered the inlet 80. For example, the first heat exchange fluid that exits the vapor generator 36 at the outlet 76 of the second region 64 may have a lower temperature and pressure than when the first heat exchange fluid entered the inlet 80 of the second region 64. The first heat exchange fluid is directed toward the second expansion valve 48 after exiting the second region 64 of the vapor generator 36. As with the first expansion valve 44, the first heat exchange fluid that is directed towards the second expansion valve 48 decreases in temperature and pressure as a result of interaction with the second expansion valve 48. As the first heat exchange fluid exits the second expansion valve 48, the first heat exchange fluid is directed toward the first evaporator 52.

Referring again to FIGS. 1-6, as the first heat exchange fluid flows through the first evaporator 52, the first heat exchange fluid thermally interacts with a third heat exchange fluid (e.g., a coolant) as indicated by arrows 116. In the first evaporator 52, the first heat exchange fluid absorbs thermal energy from the third heat exchange fluid such that the third heat exchange fluid, indicated at arrows 116, decreases in temperature and/or pressure. Accordingly, a temperature, pressure, and/or vapor percentage of the first heat exchange fluid may be greater at an outlet 120 of the first evaporator 52 when compared to an inlet 124 of the first evaporator 52. After exiting the outlet 120 of the first evaporator 52, the first heat exchange fluid is directed toward the low-pressure inlet port 84 of the compressor 28. The compressor 28 acts upon the first heat exchange fluid received at the low-pressure inlet port 84 and the mid-pressure inlet port 72 to ultimately direct the first heat exchange fluid out of the outlet port 56 of the compressor 28 and repeat the process described above for the refrigerant loop 24.

Referring further to FIGS. 1-6, in some examples, a second condenser 128 can be positioned downstream of the compressor 28 and upstream of the vapor generator 36. In various examples, the second condenser 128 may be plumbed in series with the first condenser 32. Alternatively, the second condenser 128 can be plumbed in parallel with the first condenser 32. The refrigerant loop 24 of the heat pump 20 can include a first shutoff valve 132 that is positioned upstream of the first condenser 32 and downstream of the compressor 28. The first shutoff valve 132 is associated with the first condenser 32 and is operable between an open position and a closed position. When the first shutoff valve 132 is in the open position, the first heat exchange fluid is allowed to pass through the first shutoff valve 132 and into the inlet 96 of the first region 100 of the first condenser 32. When the first shutoff valve 132 is in the closed position, the first heat exchange fluid is prevented from passing through the first shutoff valve 132 and thereby prevented from interacting with the first condenser 32. A second shutoff valve 136 can be positioned upstream of the second condenser 128 when the second condenser 128 is employed. In such an example, the second shutoff valve 136 is positioned downstream of the compressor 28.

Referring yet again to FIGS. 1-6, the second shutoff valve 136 is associated with the second condenser 128. The second shutoff valve 136 is operable between an open position and a closed position. When the second shutoff valve 136 is in the open position, the first heat exchange fluid is permitted to flow through the second shutoff valve 136 and into an inlet 140 of a first region 144 of the second condenser 128. The first region 144 of the second condenser 128 thermally interacts with a second region 148 of the second condenser 128. In some examples, a fourth heat exchange fluid may flow through the second region 148 of the second condenser 128, as indicated by arrows 152. In such examples, heat may be transferred from the first heat exchange fluid to the fourth heat exchange fluid by way of the second condenser 128. The heat acquired by the fourth heat exchange fluid may then be directed toward various components within the heat pump 20 that are external to the refrigerant loop 24. For example, the heat transferred to the fourth heat exchange fluid may be utilized at a heater core to provide heat to a cabin of a vehicle, to provide heat to one or more batteries of a vehicle during cold weather conditions, to provide heat to windshield washer fluid in preparation for deicing operations, and so on. As with the fourth heat exchange fluid, the second heat exchange fluid may extract or absorb heat from the first heat exchange fluid by way of the first condenser 32. The heat acquired by the second heat exchange fluid can be utilized in a similar manner to that discussed above with regard to the fourth heat exchange fluid. It is contemplated that, in some examples, the second and fourth heat exchange fluids may be a single heat exchange fluid that is split at a Y-shaped junction upstream of the first and second condensers 32, 128. In such an example, the second and fourth heat exchange fluids may be joined again by way of another Y-shaped junction downstream of the first and second condensers 32, 128. In examples that employ the second condenser 128, a second receiver-dryer 156 may be positioned downstream of the second condenser 128 and upstream of the vapor generator 36. In various modes of operation, the first condenser 32 and/or the second condenser 128 may receive the first heat exchange fluid to satisfy the demands of the heat pump 20. In examples where the second receiver-dryer 156 is omitted and the second condenser 128 is employed, the first and second shutoff valves 132, 136 can be employed to periodically expose the first heat exchange fluid to the first receiver-dryer 88.

With specific reference to FIGS. 3-6, in examples that included the accumulator 92, the accumulator 92 may be positioned between the first evaporator 52 and the compressor 28 such that the accumulator 92 is positioned upstream of the compressor 28 and downstream of the first evaporator 52. In various examples, the accumulator 92 may be a suction accumulator. In general, the accumulator 92 can protect the compressor 28 from liquid slugging or liquid being introduced into the compressor 28. The accumulator 92 can also retain moisture and contaminants from the refrigerant loop 24 and ensure that only refrigerant, such as the first heat exchange fluid, is returning to the compressor 28. In some examples, a heater 160 can be directly coupled to the accumulator 92. In such examples, the heater 160 can be used to provide heat to the accumulator 92 during cold startups of the heat pump 20 (e.g., when a vehicle equipped with the heat pump 20 is first started after an extended period of rest) such that a temperature, pressure, and/or vapor percentage of the first heat exchange fluid housed within the accumulator 92 may be increased. Heat transferred to the first heat exchange fluid by the heater 160 increases a vapor density, or vapor percentage, at the low-pressure inlet port 84 of the compressor 28. As the vapor portion of the first heat exchange fluid is the sole or primary portion of the first heat exchange fluid that is permitted to enter the compressor 28, the increased vapor percentage allows for a corresponding increase in mass flow of the first heat exchange fluid into the compressor 28. This increased mass flow that ultimately reaches the first condenser 32 can increase a heating capacity of the heat pump 20. The compression work performed by the compressor 28 can multiply or amplify a coefficient of performance of the heat pump 20 and/or the refrigerant loop 24. In various examples of the heat pump 20 and/or the refrigerant loop 24, the coefficient of performance can be about 1.3 with a heating capacity of 4 kW when the heater 160 is not employed. In some examples, when the heater 160 is employed, the coefficient of performance can be about 1.5 with the heating capacity being about 4.5 kW. The increase in the coefficient of performance and/or the heating capacity when employing the heater 160 may result from an amplification of the input energy (e.g., electrical input energy) from the heater 160 by the compression provided by the compressor 28. Said another way, the energy provided by the heater 160 may be amplified by the compression cycle of the compressor 28, which can in turn improve the heating capacity and the coefficient of performance of the heat pump 20 and/or the refrigerant loop 24. The multiplying or amplifying effect provided by the heater 160 can enable the use of smaller electric heaters than would otherwise be used in conjunction with the heat pump, thereby providing a cost-effective and high efficiency solution that improves the operating range of the heat pump 20 and/or the refrigerant loop 24. In some examples, the refrigerant loop 24 of the heat pump 20 may be provided with a third expansion valve 164 that is positioned downstream of the vapor generator 36 and upstream of the accumulator 92. In such an example, a second evaporator 168 can be positioned downstream of the third expansion valve 164 and upstream of the accumulator 92.

Referring again to FIGS. 3-6, the third expansion valve 164 and the second evaporator 168 may be plumbed in series to the second expansion valve 48 and the first evaporator 52. Alternatively, the third expansion valve 164 and the second evaporator 168 may be plumbed in parallel to the second expansion valve 48 and the first evaporator 52. Similar to the operation of the first evaporator 52, the first heat exchange fluid can flow through the third expansion valve 164 and into an inlet 172 of the second evaporator 168. Once the first heat exchange fluid has entered the second evaporator 168 through the inlet 172, the first heat exchange fluid is flowed through a first region 174 of the second evaporator 168 and thermally interacts with a fifth heat exchange fluid, indicated at arrows 176, which flows through a second region 178 of the second evaporator 168. Heat from the fifth heat exchange fluid can be transferred to the first heat exchange fluid by way of the second evaporator 168. Accordingly, the fifth heat exchange fluid may be cooled as a result of interaction with the second evaporator 168. The cooled fifth heat exchange fluid can be directed toward components of the heat pump 20 that are external to the refrigerant loop 24 and may benefit from heat extraction. For example, the fifth heat exchange fluid may be directed to heat-producing components of the heat pump 20, such as batteries of a vehicle, an engine of a vehicle, electronic components of a vehicle, and/or may be utilized in providing cooled air to a cabin of a vehicle that is equipped with the heat pump 20. Similarly, the third heat exchange fluid, indicated at arrows 116, that flows through the first evaporator 52 can reject heat from the third heat exchange fluid to the first heat exchange fluid by way of interaction with the first evaporator 52. The cooled third heat exchange fluid may be utilized in a similar manner to that discussed above with regard to the fifth heat exchange fluid.

Referring further to FIGS. 3-6, in various examples, the second expansion valve 48 and/or the third expansion valve 164 may be capable of operating as a shutoff valve. Accordingly, in examples that employ the second expansion valve 48 and the third expansion valve 164, the first and second evaporators 52, 168 may be employed selectively depending on the demands of the heat pump 20. As with the first and second condensers 32, 128 discussed above, the third heat exchange fluid and the fifth heat exchange fluid, which flow through the first evaporator 52 and the second evaporator 168, respectively, may be part of the same loop that is external to the refrigerant loop 24 or may be part of separate loops that are external from the refrigerant loop 24. In examples where the first and second evaporators 52, 168 are coupled to the same loop that is external to the refrigerant loop 24, the third and fifth heat exchange fluids may be the same heat exchange fluid, which is flowed through a Y-shaped junction that is upstream of the first and second evaporators 52, 168. In such an example, another Y-shaped junction may be provided downstream of the first and second evaporators 52, 168 such that the third and fifth heat exchange fluids are recombined for circulation in the loop that is external to the refrigerant loop 24.

The various architectures depicted in FIGS. 1-6 with regard to the refrigerant loop 24 are intended to be exemplary in nature and not limiting. For example, the first condenser 32 and/or the second condenser 128 may be employed in an architecture of the refrigerant loop 24 with the first evaporator 52 and/or the second evaporator 168 without departing from the concepts disclosed herein. Similarly, it is contemplated that a third condenser and/or a third evaporator may be employed to fit particular needs or demands of a given heat pump 20. The various architectures depicted for the refrigerant loop 24 with regard to the use of the first receiver-dryer 88, the second receiver-dryer 156, the accumulator 92, the first condenser 32, the second condenser 128, the first evaporator 52, and/or the second evaporator 168 are intended to depict examples of how the refrigerant loop 24 may be expanded to accommodate a variety of arrangements of the heat pump 20. Accordingly, the concepts disclosed herein can be employed to assemble an architecture for the refrigerant loop 24 that is not explicitly shown, but would fall within the concepts disclosed herein.

Referring now to FIGS. 7-11, the refrigerant loop 24 discussed with regard to FIGS. 1-6 are expanded upon to show additional architectures that are contemplated by the present disclosure. As discussed above, the heat pump 20 includes the refrigerant loop 24. The refrigerant loop 24 includes the compressor 28, the first condenser 32, the vapor generator 36, the branching point 40, the first expansion valve 44, the second expansion valve 48, and the first evaporator 52. In the depicted examples, the branching point 40 may be referred to as a first branching point 180. The first condenser 32 is positioned downstream of the compressor 28. The first condenser 32 is coupled to the outlet port 56 of the compressor 28. The vapor generator 36 is positioned downstream of the first condenser 32. The vapor generator 36 includes the first region 60 and the second region 64. The first branching point 180 is positioned between the first condenser 32 and the vapor generator 36. The first branching point 180 diverts a portion of the first heat exchange fluid that is circulating through the refrigerant loop 24 to the first region 60 of the vapor generator 36. The first expansion valve 44 is positioned between the first branching point 180 in the first region 60 of the vapor generator 36. The outlet 68 of the first region 60 of the vapor generator 36 is coupled to the mid-pressure inlet port 72 of the compressor 28. The second expansion valve 48 is positioned downstream of the vapor generator 36. The second expansion valve 48 is coupled to the outlet 76 of the second region 64 of the vapor generator 36. The inlet 80 of the second region 64 of the vapor generator 36 is coupled to the first condenser 32. The first evaporator 52 is positioned downstream of the second expansion valve 48. The first evaporator 52 is coupled to the second expansion valve 48. The first evaporator 52 is positioned upstream of the compressor 28. The first evaporator is coupled to the low-pressure inlet port 84 of the compressor 28.

Referring again to FIGS. 7-11, the depicted architectures of the refrigerant loop 24 are shown with the first receiver-dryer 88. However, these architectures are not limited to the sole use of the first receiver-dryer 88 to the exclusion of the incorporation of the accumulator 92. Rather, for the sake of brevity, the additional architectures that would employ the accumulator 92 are omitted as such arrangements have been discussed with regard to FIGS. 1-6 and such teachings can be employed in arriving at architectures that employ the accumulator 92. By way of example, the accumulator 92, when employed, can be positioned immediately upstream of the compressor 28 such that the low-pressure inlet port 84 of the compressor 28 receives the first heat exchange fluid directly from the accumulator 92. As with the above-described architectures, the first condenser 32 can receive the first heat exchange fluid from the outlet port 56 of the compressor 28 at the inlet 96 of the first region 100 of the first condenser 32. As the first heat exchange fluid flows through the first region 100 of the first condenser 32, the first heat exchange fluid thermally interacts with the second heat exchange fluid that is flowing through the second region 104 of the first condenser 32, as indicated by the arrows 106. The first heat exchange fluid exits the first region 100 of the first condenser 32 by way of the outlet 108 of the first condenser 32. Next, the first heat exchange fluid can flow into the first receiver-dryer 88 after exiting the first condenser 32.

Referring further to FIGS. 7-11, as stated above, the first receiver-dryer 88 can act as a temporary storage container for the first heat exchange fluid during low system demands when operating the heat pump 20. Additionally, the first receiver-dryer 88 can contain a desiccant that is used to absorb moisture (e.g., water) that may have entered the first heat exchange fluid. In some examples, the first receiver-dryer 88 may include a filter that can trap debris that may have entered into the refrigerant loop 24 and/or the first heat exchange fluid. Upon exiting the first receiver-dryer 88, the first heat exchange fluid encounters the first branching point 180. As the first heat exchange fluid encounters the first branching point 180, a portion of the first heat exchange fluid is diverted toward of the first expansion valve 44, while the remaining portion of the first heat exchange fluid continues toward the vapor generator 36. In various examples, the portion of the first heat exchange fluid that is diverted toward the first expansion valve 44 can be expressed as a ratio or percentage. For example, expressing the ratio as a percentage of the first heat exchange fluid that is diverted toward the first expansion valve 44, the first expansion valve 44 can receive about 5%, about 10%, about 15%, about 20%, about 25%, about 30%, about 35%, about 40%, about 45%, about 50%, about 55%, or about 60% of the first heat exchange fluid that is exiting the first receiver-dryer 88. The remainder, or balance in percentage, of the first heat exchange fluid exiting the first receiver-dryer 88 that is not diverted toward the first expansion valve 44 can continue toward of the vapor generator 36. The portion of the first heat exchange fluid that is diverted toward the first expansion valve 44 decreases in pressure and temperature as a result of interaction with the first expansion valve 44. After exiting the first expansion valve 44, the first heat exchange fluid is directed to the inlet 112 of the first region 60 of the vapor generator 36. As the first heat exchange fluid flows through the first region 60 of the vapor generator 36, the first heat exchange fluid within the first region 60 thermally interacts with the first heat exchange fluid flowing through the second region 64 of the vapor generator 36. As a result of the thermal interaction between the first heat exchange fluid within the first region 60 and the first heat exchange fluid within the second region 64, the first heat exchange fluid within the first region 60 exits the vapor generator 36 at the outlet 68 of the first region 60 at a higher temperature, pressure, and/or vapor percentage. Accordingly, the portion of the refrigerant loop 24 that includes the first branching point 180, the first expansion valve 44, and the vapor generator 36 may be referred to as a vapor generator or a vapor generation loop.

Referring still further to FIGS. 7-11, as the first heat exchange fluid exits the outlet 68 of the first region 60, the first heat exchange fluid is directed toward the mid-pressure inlet port 72 of the compressor 28. The first heat exchange fluid from the first region 60 of the vapor generator 36 is injected into the compressor 28. The injection of the first heat exchange fluid at the mid-pressure inlet port 72 of the compressor 28 can improve the efficiency of the refrigerant loop 24 and/or increase heat exchange capacity of the refrigerant loop 24. For example, the injection of the first heat exchange fluid at the mid-pressure inlet port 72 of the compressor 28 can increase a condensing capacity of the refrigerant loop 24 while decreasing a load experienced by the compressor 28. The improved condensing capacity of the refrigerant loop 24 and the decreased load on the compressor 28 can contribute to performance and efficiency improvements for the heat pump 20 and the refrigerant loop 24. Additionally, the injection of the first heat exchange fluid at the mid-pressure inlet port 72 can increase the ambient temperature operating range of the heat pump 20 and/or the refrigerant loop 24. The portion of the first heat exchange fluid that was not diverted toward the first expansion valve 44 and instead flowed toward the inlet 80 of the second region 64 of the vapor generator 36 interacts with the first heat exchange fluid that was diverted toward the first expansion valve 44. During this thermal interaction between the first heat exchange fluid within the second region 64 and the first heat exchange fluid within the first region 60, heat is transferred from the first heat exchange fluid within the second region 64 to the first heat exchange fluid within the first region 60. Accordingly, the first heat exchange fluid exiting the vapor generator 36 at the outlet 76 may be at a different temperature, pressure, and/or vapor percentage than the first heat exchange fluid that entered the inlet 80. For example, the first heat exchange fluid that exits the vapor generator 36 at the outlet 76 of the second region 64 may have a lower temperature and pressure when compared to the first heat exchange fluid that entered the inlet 80.

Referring yet again to FIGS. 7-11, the first heat exchange fluid is directed toward the second expansion valve 48 after exiting the second region 64 of the vapor generator 36. As with the first expansion valve 44, the first heat exchange fluid that is directed towards the second expansion valve 48 decreases in temperature and pressure as a result of interaction with the second expansion valve 48. As the first heat exchange fluid exits the second expansion valve 48, the first heat exchange fluid is directed toward the first evaporator 52. As the first heat exchange fluid flows through the first evaporator 52, the first heat exchange fluid thermally interacts with the third heat exchange fluid (e.g., a coolant) as indicated by the arrows 116. In the first evaporator 52, the first heat exchange fluid absorbs thermal energy from the third heat exchange fluid such that the third heat exchange fluid, indicated at the arrows 116, decreases in temperature and/or pressure. Accordingly, a temperature, pressure, and/or vapor percentage of the first heat exchange fluid may be greater at the outlet 120 of the first evaporator 52 when compared to the inlet 124 of the first evaporator 52. After exiting the outlet 120 of the first evaporator 52, the first heat exchange fluid is directed toward the low-pressure inlet port 84 of the compressor 28. The compressor 28 acts upon the first heat exchange fluid received at the low-pressure inlet port 84 and the mid-pressure inlet port 72 to ultimately direct the first heat exchange fluid out of the outlet port 56 of the compressor 28 and repeat the process described above for the refrigerant loop 24.

Referring again to FIGS. 7-11, the refrigerant loop 24 of the heat pump 20 may be provided with the second evaporator 168 positioned downstream of the vapor generator 36 and coupled to the outlet 76 of the second region 64 of the vapor generator 36. In such an example, the third expansion valve 164 can be positioned between the second evaporator 168 and the vapor generator 36. Additionally, in such examples, the second evaporator 168 is positioned upstream of the compressor 28 and is coupled to the low-pressure inlet port 84 of the compressor 28. In some examples, the second evaporator 168 and the third expansion valve 164 can be plumbed in series with the first evaporator 52 and the second expansion valve 48. Alternatively, the second evaporator 168 and the third expansion valve 164 can be plumbed in parallel to the first evaporator 52 and the second expansion valve 48. Similar to the operation of the first evaporator 52, the first heat exchange fluid can flow through the third expansion valve 164 and into the inlet 172 of the second evaporator 168. Once the first heat exchange fluid has entered the second evaporator 168 through the inlet 172, the first heat exchange fluid flows through the first region 174 of the second evaporator 168 and thermally interacts with the first heat exchange fluid, indicated by the arrows 176, which flows through the second region 178 of the second evaporator 168.

Referring further to FIGS. 7-11, heat from the fifth heat exchange fluid can be transferred to the first heat exchange fluid by way of the second evaporator 168. Accordingly, the fifth heat exchange fluid may be cooled as a result of interaction with the second evaporator 168. The cooled fifth heat exchange fluid can be directed toward components of the heat pump 20 that are external to the refrigerant loop 24 and may benefit from heat extraction. For example, the fifth heat exchange fluid may be directed to heat-producing components of the heat pump 20, such as batteries of a vehicle, an engine of a vehicle, electronic components of the vehicle, and/or may be utilized in providing cooled air to a cabin of a vehicle that is equipped with the heat pump 20. Similarly, the third heat exchange fluid, indicated at the arrows 116, that flows through the first evaporator 52 can reject heat from the third heat exchange fluid to the first heat exchange fluid by way of interaction with the first evaporator 52. The cooled third heat exchange fluid may be utilized in a similar manner to that discussed above with regard to the fifth heat exchange fluid. In various examples, the second expansion valve 48 and/or the third expansion valve 164 may be capable of operating as a shut off valve. Accordingly, in examples that employ the second expansion valve 48 and the third expansion valve 164, the first and second evaporator 52, 168 may be employed selectively depending on the demand of the heat pump 20. As with the first and second condensers 32, 128 discussed above, the third heat exchange fluid and the fifth heat exchange fluid, which flow through the first evaporator 52 and the second evaporator 168, respectively, may be part of the same loop that is external to the refrigerant loop 24 or may be part of different loops that are external from the refrigerant loop 24. In examples where the first and second evaporators 52, 168 are coupled to the same loop that is external to the refrigerant loop 24, the third and fifth heat exchange fluids may be the same heat exchange fluid, which is flowed through a Y-shaped junction that is upstream of the first and second evaporators 52, 168. In such an example, another Y-shaped junction may be provided downstream of the first and second evaporators 52, 168 such that the third and fifth heat exchange fluids are combined for circulation in the loop that is external to the refrigerant loop 24. In examples where the third expansion valve 164 and the second evaporator 168 are plumbed in parallel to the second expansion valve 48 and the first evaporator 52, a second branching point 184 can be positioned downstream of the outlet 76 of the second region 64 of the vapor generator 36 and upstream of the second and third expansion valves 48, 164. Additionally, in such examples, a first convergence point 188 may be positioned upstream of the compressor 28 and downstream of the first and second evaporators 52, 168.

Referring still further to FIGS. 7-11, the vapor generator 36 can include a third region 192. The third region 192 is positioned downstream of the first evaporator 52 and upstream of the compressor 28. An outlet 196 of the third region 192 is coupled to the low-pressure inlet port 84 of the compressor 28. For example, the outlet 196 of the third region 192 can be directly coupled to the low-pressure inlet port 84 of the compressor 28. In such examples, the first, second, and third regions 60, 64, 192 of the vapor generator 36 thermally interact with one another such that heat is transferred between the first heat exchange fluid in each of the sections of the vapor generator. More specifically, the first heat exchange fluid flowing through the first region 60 absorbs heat from the first heat exchange fluid that is flowing through the second region 64. This arrangement is beneficial for the next stage of the refrigerant loop 24 that each of these portions of the first heat exchange fluid will be advancing to once exiting the vapor generator 36. For example, the first heat exchange fluid in the first region 60 absorbs some of the heat from the first heat exchange fluid within the second region 64 such that a temperature, pressure, and/or vapor percentage of the first heat exchange fluid is increased at the outlet 68 of the first region 60. This increase in the temperature, the pressure, and/or the vapor percentage of the first heat exchange fluid that is entering into the mid-pressure inlet port 72 of the compressor 28 can improve an efficiency or capacity of the refrigerant loop 24 and/or the compressor 28, as discussed above. In a related, and inverse, manner the first heat exchange fluid flowing through the second region 64 exhibits a decreased temperature, pressure, and/or vapor percentage at the outlet 76 of the second region 64. Once leaving the outlet 76 of the second region 64, the first heat exchange fluid flows to the second expansion valve 48 and/or the third expansion valve 164, as well as the first evaporator 52 and/or the second evaporator 168. At the first evaporator 52 and/or the second evaporator 168, the first heat exchange fluid can cool the third heat exchange fluid and/or the fifth heat exchange fluid by absorbing heat from these other heat exchange fluids. Accordingly, the first heat exchange fluid may be provided with a degree of pre-cooling by the interaction between the first and second regions 60, 64 within the vapor generator 36. This pre-cooling of the first heat exchange fluid can improve a coefficient of performance of the heat pump 20 and/or the refrigerant loop 24. For example, by pre-cooling the first heat exchange fluid prior to interaction with the second expansion valve 48 and the first evaporator 52 and/or interaction with the third expansion valve 164 and the second evaporator 168, a greater amount of heat or thermal energy may be extracted from the third heat exchange fluid and/or the fifth heat exchange fluid.

Referring yet again to FIGS. 7-11, the third region 192 can thermally interact with the second region 64 in a similar manner to that described above with regard to the first region 60. Accordingly, as with the first region 60, the third region 192 may extract a degree of heat from the first heat exchange fluid flowing through the second region 64 such that a temperature, pressure, and/or vapor percentage of the first heat exchange fluid flowing through the third region 192 may be increased. As with the thermal exchange discussed with regard to the first region 60, by increasing the temperature, pressure, and/or vapor percentage of the first heat exchange fluid that is exiting the third region 192, the efficiency and/or capacity of the heat pump 20 and/or the compressor 28 may be similarly increased. Additionally, the first heat exchange fluid flowing through the second region 64 may be further pre-cooled and provided with an increase in the benefits discussed above with regard to the pre-cooling provided by the first region 60. In various examples, the pre-cooling provided by the first region 60 may be referred to as a first pre-cooling of the first heat exchange fluid flowing through the second region 64 and the pre-cooling provided by the third region 192 may be referred to as a second pre-cooling of the first heat exchange fluid flowing through the second region 64. In the example of the vapor generator 36 described above as including the third region 192, the first, second, and third regions 60, 64, 192 are plumbed in parallel to one another and may be housed within a single body of the vapor generator 36. It may be beneficial to plumb the portion of the vapor generator 36 that experiences cooling (e.g., the second region 64) between the portions of the vapor generator 36 that experience heating (e.g., the first and third regions 60, 192) so that heat may be simultaneously extracted.

Referring still further to FIGS. 7-11, in some examples, the third region 192 of the vapor generator 36 may be omitted and a heat exchanger 200 may be plumbed in series with the vapor generator 36 instead. The heat exchanger 200, when employed, includes a first region 204 and a second region 208. The first region 204 of the heat exchanger 200 is plumbed in series with the second region 64 of the vapor generator 36 such that an inlet 212 of the first region 204 of the heat exchanger 200 is directly coupled to the outlet 76 of the second region 64 of the vapor generator 36. The second region 208 of the heat exchanger 200 is positioned downstream of the first evaporator 52 and upstream of the compressor 28. An outlet 216 of the second region 208 of the heat exchanger 200 is coupled to the low-pressure inlet port 84 of the compressor 28. The benefits of the heat exchanger 200 are the same as that described above with regard to the third region 192. More specifically, the heat exchanger 200 may extract a degree of heat from the first heat exchange fluid flowing through the first region 204 thereof such that a temperature, pressure, and/or vapor percentage of the first heat exchange fluid flowing through the second region 208 may be increased. Increasing the temperature, pressure, and/or vapor percentage of the first heat exchange fluid that is exiting the second region 208 can increase the efficiency and/or capacity of the heat pump 20 and/or the compressor 28. Additionally, the first heat exchange fluid flowing through the first region 204 may be further pre-cooled and provided with an increase in the benefits discussed above with regard to the pre-cooling provided by the vapor generator 36. In various examples, the pre-cooling provided by the vapor generator 36 may be referred to as a first pre-cooling of the first heat exchange fluid flowing through the second region 64 and the pre-cooling provided by the heat exchanger 200 may be referred to as a second pre-cooling of the first heat exchange fluid flowing through the first region 204.

Referring yet again to FIGS. 7-11, the refrigerant loop 24 of the heat pump 20 can include a bypass loop 220. The bypass loop 220 includes a shutoff valve 224 that is operable between an open position and a closed position. When the shutoff valve 224 is in the open position, a section of the refrigerant loop is bypassed. More specifically, in examples that employ the third region 192, the open position of the shutoff valve 224 bypasses the third region 192 of the vapor generator 36. Similarly, in examples that employ the heat exchanger 200, the open position of the shutoff valve 224 can bypass the second region 208 of the heat exchanger 200. Accordingly, the bypass loop 220 couples to the refrigerant loop 24 at a third branching point 228. The third branching point 228 is positioned upstream of the third region 192 of the vapor generator 36. The third branching point 228 can be positioned downstream of the first evaporator 52 and/or the second evaporator 168. The third branching point 228 may alternatively be referred to as an inlet of the bypass loop 220. In various examples, the third region 192 may provide sufficient back pressure or resistance to flow that the first heat exchange fluid does not enter into an inlet 232 of the third region 192 when the shutoff valve 224 is in the open position. Accordingly, a majority or an entirety of the first heat exchange fluid encountering the third branching point 228 may be diverted to the bypass loop 220 once the shutoff valve 224 is in the open position. The bypass loop 220 may rejoin the refrigerant loop 24 at a second convergence point 236 that is positioned downstream of the outlet 196 of the third region 192 of the vapor generator 36 and upstream of the low-pressure inlet port 84 of the compressor 28. Bypassing the third region 192 of the vapor generator or the second region 208 of the heat exchanger 200 can, for example, avoid the second pre-cooling of the first heat exchange fluid during heating modes of operation, where the additional pre-cooling may negatively impact performance of the heat pump 20 and/or the refrigerant loop 24.

Referring again to FIGS. 7-11, in some examples, the bypass loop 220 can include a bypass heat exchanger 240 that is positioned downstream of the shutoff valve 224. In various examples, a bypass heater 244 may be directly coupled to the bypass heat exchanger 240 such that the bypass heater 244 provides thermal energy to the first heat exchange fluid when the first heat exchange fluid is passed through the bypass heat exchanger 240. In such examples, the bypass heater 244 can operate in a similar manner to the heater 160 that was discussed as being directly coupled to the accumulator 92 with regard to FIGS. 3-6. For example, the bypass heater 244 can be used to provide heat to the first heat exchange fluid during cold startups of the heat pump 20 (e.g., when a vehicle equipped with the heat pump 20 is first started after an extended period of rest) such that a temperature, pressure, and/or vapor percentage of the first heat exchange fluid that is passing through the bypass heat exchanger 240 may be increased. Such a mode of operation can be beneficial when heat-producing components of the heat pump 20 have not been operating for a long enough period of time to result in a desired amount of heat exchange within the refrigerant loop 24 and/or throughout the heat pump 20. As with the heater 160, heat transferred to the first heat exchange fluid by the bypass heater 244 increases a vapor density, or vapor percentage, at the low-pressure inlet port 84 of the compressor 28. As the vapor portion of the first heat exchange fluid is the sole or primary portion of the first heat exchange fluid that is permitted to enter the compressor 28, the increased vapor percentage allows for a corresponding increase in mass flow of the first heat exchange fluid into the compressor 28. This increased mass flow that ultimately reaches the first condenser 32 can increase a heating capacity of the heat pump 20. The compression work performed by the compressor 28 can multiply or amplify a coefficient of performance of the heat pump 20 and/or the refrigerant loop 24. In various examples of the heat pump 20 and/or the refrigerant loop 24, the coefficient of performance can be about 1.3 with a heating capacity of 4 kW when the heater 160 is not employed. In some examples, when the heater 160 is employed, the coefficient of performance can be about 1.5 with the heating capacity being about 4.5 kW. The increase in the coefficient of performance and/or the heating capacity when employing the heater 160 may result from an amplification of the input energy (e.g., electrical input energy) from the heater 160 by the compression provided by the compressor 28. Said another way, the energy provided by the heater 160 may be amplified by the compression cycle of the compressor 28, which can in turn improve the heating capacity and the coefficient of performance of the heat pump 20 and/or the refrigerant loop 24. The multiplying or amplifying effect provided by the bypass heater 244 can enable the use of smaller electric heaters than would otherwise be used in conjunction with the heat pump, thereby providing a cost-effective and high efficiency solution that improves the operating range of the heat pump 20 and/or the refrigerant loop 24.

Figure 11:
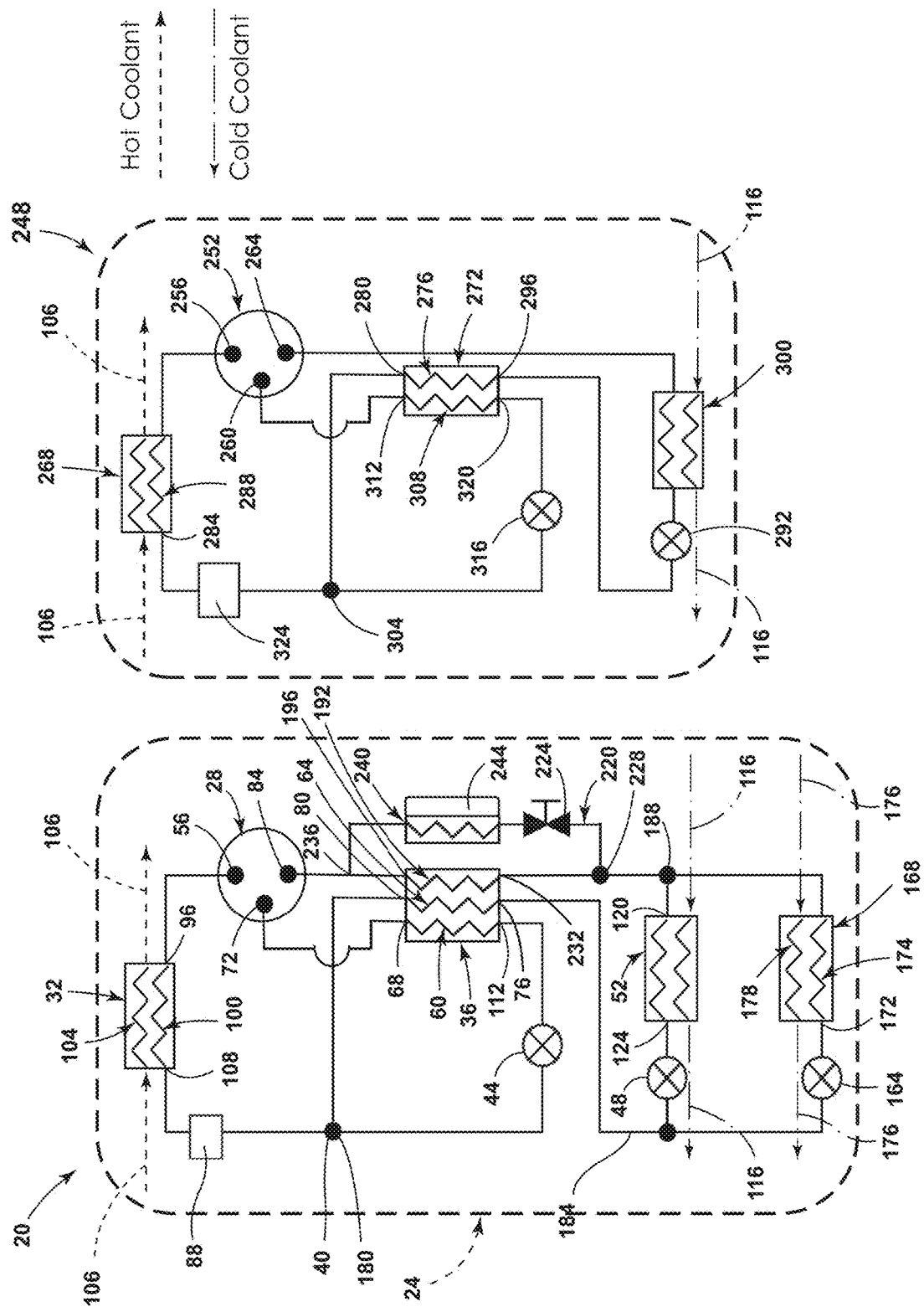
FIG. 11 is a schematic representation of the refrigerant loop arrangement, illustrating an auxiliary refrigerant loop plumbed in series with the refrigerant loop, according to another example.

With particular reference to FIG. 11, the heat pump 20 may be provided with an auxiliary refrigerant loop 248. The auxiliary refrigerant loop 248 can include an auxiliary compressor 252. The auxiliary compressor 252, similar to the compressor 28, includes an outlet port 256, a mid-pressure inlet port 260, and a low-pressure inlet port 264. An auxiliary condenser 268 is positioned downstream of the auxiliary compressor 252 and coupled to the outlet port 256 of the auxiliary compressor 252. An auxiliary vapor generator 272 is positioned downstream of the auxiliary condenser 268. A first region 276 of the auxiliary vapor generator 272 is coupled to the auxiliary condenser 268. More specifically, an inlet 280 of the first region 276 is coupled to an outlet 284 of a first region 288 of the auxiliary condenser. A first auxiliary expansion valve 292 is positioned downstream of the auxiliary vapor generator 272 and is coupled to the auxiliary vapor generator 272 at an outlet 296 of the first region 276 of the auxiliary vapor generator 272. An auxiliary evaporator 300 is positioned downstream of the first auxiliary expansion valve 292. The auxiliary evaporator 300 is upstream of the auxiliary compressor 252 and is coupled to the low-pressure inlet port 264 of the auxiliary compressor 252. An auxiliary branching point 304 is positioned between the auxiliary condenser 268 and the auxiliary vapor generator 272. The auxiliary branching point 304 diverts a portion of the auxiliary heat exchange fluid circulating through the auxiliary refrigerant loop 248 to a second region 308 of the auxiliary vapor generator 272. An outlet 312 of the second region 308 of the auxiliary vapor generator 272 is coupled to the mid-pressure inlet port 260 of the auxiliary compressor 252.

Referring again to FIG. 11, a second auxiliary expansion valve 316 is positioned between the auxiliary branching point 304 and an inlet 320 of the second region 308 of the auxiliary vapor generator 272. In some examples, the auxiliary refrigerant loop 248 can include an auxiliary receiver-dryer 324 that is positioned downstream of the auxiliary condenser 268. In various examples, the auxiliary condenser 268 and the first condenser 32 can each receive the second heat exchange fluid that is circulated through a first external loop. For example, the auxiliary condenser 268 and the first condenser 32 can be plumbed in series along the first external loop such that the refrigerant loop 24 and the auxiliary refrigerant loop 248 each thermally interact with the same heat exchange fluid and amplify the heat exchange capabilities of one another. Alternatively, the auxiliary condenser 268 and the first condenser 32 may be plumbed in parallel and serve separate components and/or separate external loops. Similarly, in some examples, the first evaporator 52 and the auxiliary evaporator 300 can each receive the third heat exchange fluid, as indicated by the arrows 116, with the third heat exchange fluid being circulated through a second external loop. For example, the first evaporator 52 and the auxiliary evaporator 300 can be plumbed in series along the second external loop such that the refrigerant loop 24 and the auxiliary refrigerant loop 248 collectively act upon the third heat exchange fluid. Accordingly, the refrigerant loop 24 and the auxiliary refrigerant loop 248 may amplify a heat exchange capacity and/or a heat exchange efficiency of the heat pump 20. Alternatively, the first evaporator 52 and the auxiliary evaporator 300 may be plumbed in parallel and serve separate components and/or separate external loops.

FIG. 11 is an exemplary depiction of combining two of the arrangements of the heat pump 20 disclosed herein in a manner that can be utilized for a particular set of demands for a given one of the heat pumps 20. Therefore, FIG. 11 represents a non-limiting example of how one may combine the various heat pump 20 and/or refrigerant loop 24 arrangements disclosed herein to obtain a desired heat exchange capacity and/or heat exchange efficiency. It is contemplated that two or more of the refrigerant loops 24 disclosed herein may be employed in a given example of the heat pump 20 without departing from the concepts disclosed herein. In a similar manner, the present disclosure provides a variety of modifications to the refrigerant loop 24 that can be employed in an effort to fine-tune the heat exchange capacity and/or the heat exchange efficiency provided to the heat pump 20 and/or the refrigerant loop 24 (e.g., adjusting the number of condensers, the number of evaporators, the number of expansion valves, and so on) without departing from the concepts disclosed herein. Regardless of the architecture of the refrigerant loop 24 and/or the number of refrigerant loops 24 employed in a given heat pump 20, the heat exchange fluids that are external to the refrigerant loop(s) 24 (e.g., the second heat exchange fluid, the third heat exchange fluid, the fourth heat exchange fluid, and/or the fifth heat exchange fluid) may circulate through independent heat exchange loops (e.g., coolant loops) that do not thermally interact in a direct manner (e.g., no coolant-to-coolant heat exchange). Alternatively, one or more of the heat exchange fluids that are external to the refrigerant loop(s) 24 may circulate through a common heat exchange loop that is external to the refrigerant loop(s) 24, such as the example(s) described above with regard to Y-shaped junctions upstream and/or downstream of various components of the refrigerant loop 24. However, the present disclosure is not limited by any particular architecture of heat exchange loops that are external to the refrigerant loop 24 (e.g., coolant loops).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
  a refrigerant loop, wherein the refrigerant loop comprises:
    a compressor;
    a first condenser downstream of the compressor and coupled to an outlet port of the compressor;
    a vapor generator downstream of the first condenser, wherein the vapor generator comprises a first region having a first inlet and a first outlet and a second region having a second inlet and a second outlet, and wherein the vapor generator receives a first heat exchange fluid;
    a first receiver-dryer positioned between the first condenser and the vapor generator;
    a first branching point positioned between the first condenser and the vapor generator, wherein the first branching point diverts a portion of the first heat exchange fluid circulating through the refrigerant loop to the first inlet of the vapor generator;
    a first expansion valve positioned between the first branching point and the first inlet of the vapor generator, wherein the first outlet of the vapor generator is coupled to a mid-pressure inlet port of the compressor;
    a first evaporator downstream of the vapor generator and coupled to the second outlet of the vapor generator;
    a second expansion valve positioned between the first evaporator and the vapor generator, wherein the first evaporator is upstream of the compressor and is coupled to a low-pressure inlet port of the compressor; and a heat exchanger having a first region and a second region, wherein the first region of the heat exchanger is positioned between the second outlet of the vapor generator and the second expansion valve, wherein the first region of the heat exchanger is plumbed in series with the second region of the vapor generator such that an inlet of the first region of the heat exchanger is directly coupled to an outlet of the second region of the vapor generator.

2. The heat pump of claim 1, wherein an inlet of the second region of the heat exchanger is positioned downstream of the first evaporator.

3. The heat pump of claim 1, wherein an outlet of the second region of the heat exchanger is positioned upstream of the low-pressure inlet port of the compressor.

4. The heat pump of claim 1, further comprising:
a second evaporator downstream of the vapor generator and coupled to the second outlet of the vapor generator.

5. The heat pump of claim 4, wherein the second evaporator is plumbed in parallel to the first evaporator.

6. The heat pump of claim 4, further comprising:
a third expansion valve positioned between the second evaporator and the vapor generator.

7. The heat pump of claim 6, wherein the third expansion valve is plumbed in parallel with the second expansion valve.

8. The heat pump of claim 4, wherein an inlet of the second region of the heat exchanger is positioned downstream of the second evaporator.

9. The heat pump of claim 1, further comprising:
a bypass loop having an inlet and an outlet, wherein the bypass loop is configured to bypass the second region of the heat exchanger.

10. The heat pump of claim 9, wherein the inlet of the bypass loop is positioned immediately upstream of the second region of the heat exchanger.

11. The heat pump of claim 9, wherein the outlet of the bypass loop is positioned immediately upstream of the low-pressure inlet port of the compressor.

12. The heat pump of claim 9, wherein the bypass loop comprises a shutoff valve positioned between the inlet of the bypass loop and the outlet of the bypass loop.

13. The heat pump of claim 1, further comprising:
an auxiliary refrigerant loop, wherein the auxiliary refrigerant loop comprises:
an auxiliary compressor;
an auxiliary condenser downstream of the auxiliary compressor and coupled to an outlet port of the auxiliary compressor;
an auxiliary expansion valve downstream of the auxiliary condenser; and
an auxiliary evaporator downstream of the auxiliary expansion valve and coupled to the auxiliary expansion valve, wherein the auxiliary evaporator is upstream of the auxiliary compressor and is coupled to a low-pressure inlet port of the auxiliary compressor.

14. The heat pump of claim 13, further comprising:
an auxiliary receiver-dryer positioned downstream of the auxiliary condenser, wherein the auxiliary receiver-dryer is positioned upstream of the auxiliary evaporator.

15. A heat pump, comprising:
a refrigerant loop, wherein the refrigerant loop comprises:
a compressor;
a first condenser downstream of the compressor and coupled to an outlet port of the compressor;
a vapor generator downstream of the first condenser, wherein the vapor generator comprises a first region having a first inlet and a first outlet and a second region having a second inlet and a second outlet, and wherein the vapor generator receives a first heat exchange fluid;
a first receiver-dryer positioned between the first condenser and the vapor generator;
a first branching point positioned between the first condenser and the vapor generator, wherein the first branching point diverts a portion of the first heat exchange fluid circulating through the refrigerant loop to the first inlet of the vapor generator;
a first expansion valve positioned between the first branching point and the first inlet of the vapor generator, wherein the first outlet of the vapor generator is coupled to a mid-pressure inlet port of the compressor;
a first evaporator downstream of the vapor generator and coupled to the second outlet of the vapor generator;
a second expansion valve positioned between the first evaporator and the vapor generator, wherein the first evaporator is upstream of the compressor and is coupled to a low-pressure inlet port of the compressor;
a heat exchanger having a first region and a second region, wherein the first region of the heat exchanger is positioned between the second outlet of the vapor generator and the second expansion valve, wherein the first region of the heat exchanger is plumbed in series with the second region of the vapor generator such that an inlet of the first region of the heat exchanger is directly coupled to an outlet of the second region of the vapor generator, wherein an inlet of the second region of the heat exchanger is positioned downstream of the first evaporator, wherein an outlet of the second region of the heat exchanger is positioned upstream of the low-pressure inlet port of the compressor;
a second evaporator downstream of the vapor generator and coupled to the second outlet of the vapor generator, wherein the second evaporator is plumbed in parallel to the first evaporator, and wherein an inlet of the second region of the heat exchanger is positioned downstream of the second evaporator; and
a third expansion valve positioned between the second evaporator and the vapor generator, wherein the third expansion valve is plumbed in parallel to the second expansion valve.

16. The heat pump of claim 15, further comprising:
a bypass loop having an inlet and an outlet, wherein the bypass loop is configured to bypass the second region of the heat exchanger, and wherein the inlet of the bypass loop is positioned immediately upstream of the second region of the heat exchanger.

17. The heat pump of claim 16, wherein the outlet of the bypass loop is positioned immediately upstream of the low-pressure inlet port of the compressor.

18. The heat pump of claim 16, wherein the bypass loop comprises a shutoff valve positioned between the inlet of the bypass loop and the outlet of the bypass loop.

19. The heat pump of claim 15, further comprising:
an auxiliary refrigerant loop, wherein the auxiliary refrigerant loop comprises:
- an auxiliary compressor;
- an auxiliary condenser downstream of the auxiliary compressor and coupled to an outlet port of the auxiliary compressor;
- an auxiliary expansion valve downstream of the auxiliary condenser; and
- an auxiliary evaporator downstream of the auxiliary expansion valve and coupled to the auxiliary expansion valve, wherein the auxiliary evaporator is upstream of the auxiliary compressor and is coupled to a low-pressure inlet port of the auxiliary compressor.

20. The heat pump of claim 19, further comprising:
an auxiliary receiver-dryer positioned downstream of the auxiliary condenser, wherein the auxiliary receiver-dryer is positioned upstream of the auxiliary evaporator.

* * * * *